United States Patent
Schwerdtner

(10) Patent No.: US 9,513,599 B2
(45) Date of Patent: Dec. 6, 2016

(54) PROJECTION DEVICE AND METHOD FOR HOLOGRAPHIC RECONSTRUCTION OF SCENES

(71) Applicant: SEEREAL TECHNOLOGIES GMBH, Dresden (DE)

(72) Inventor: Armin Schwerdtner, Dresden (DE)

(73) Assignee: SEEREAL TECHNOLOGIES GmbH, Dresden (DE)

( * ) Notice: Subject to any disclaimer, the term of this patent is extended or adjusted under 35 U.S.C. 154(b) by 0 days.

(21) Appl. No.: 14/828,973

(22) Filed: Aug. 18, 2015

(65) Prior Publication Data

US 2015/0355597 A1  Dec. 10, 2015

Related U.S. Application Data

(62) Division of application No. 11/914,278, filed as application No. PCT/DE2006/000896 on May 12, 2006, now Pat. No. 9,116,505.

(30) Foreign Application Priority Data

May 13, 2005  (DE) .................. 10 2005 023 743

(51) Int. Cl.
  *G03H 1/08*  (2006.01)
  *G03H 1/10*  (2006.01)
  (Continued)

(52) U.S. Cl.
  CPC .......... *G03H 1/0866* (2013.01); *G02B 5/1876* (2013.01); *G03H 1/16* (2013.01);
  (Continued)

(58) Field of Classification Search
  CPC .. G03H 1/2294; G03H 1/2205; G03H 1/0005; G03H 2001/221; G03H 2001/2239; G03H 2210/30; G03H 2225/60; G03H 2001/0224; G03H 1/0866; G03H 2001/2242; G03H 2001/2271; G03H 2223/23; G03H 2223/19; G03H 2225/52; G03H 1/2249
  (Continued)

(56) References Cited

U.S. PATENT DOCUMENTS 3,917,380 A  *  11/1975  Kato .................. G03H 1/16
  359/35
4,208,086 A  6/1980  Perry
  (Continued)

FOREIGN PATENT DOCUMENTS

DE  20 2004 019513 U1  2/2005
EP  1 467 263 A  10/2004
  (Continued)

OTHER PUBLICATIONS

Fukaya N. et al., "Eye-Position Tracing Type Electro-Holographic Display Using Liquidcrystal Devices," Asia Display, Oct. 18, 1995, pp. 963-964.
  (Continued)

*Primary Examiner* — Jade R Chwasz
(74) *Attorney, Agent, or Firm* — Saul Ewing LLP

(57) ABSTRACT

A holographic reconstruction of scenes includes a light modulator, an imaging system with at least two imaging means and an illumination device with sufficient coherent light for illumination of hologram coded in the light modulator. The at least two imaging means are arranged such that a first imaging means is provided for the magnified imaging of the light modulator on a second imaging means. The second imaging means is provided for imaging of a plane of a spatial frequency spectrum of the light modulator in a
  (Continued)

viewing plane at least one viewing window. The viewing window corresponds to a diffraction order of the spatial frequency spectrum.

17 Claims, 7 Drawing Sheets

(51) Int. Cl.
    *G02B 5/32* (2006.01)
    *G03H 1/22* (2006.01)
    *G03H 1/16* (2006.01)
    *G02B 5/18* (2006.01)

(52) U.S. Cl.
    CPC ......... *G03H 1/2202* (2013.01); *G03H 1/2294* (2013.01); *G03H 1/2249* (2013.01); *G03H 2001/0883* (2013.01); *G03H 2001/221* (2013.01); *G03H 2001/226* (2013.01); *G03H 2001/2239* (2013.01); *G03H 2001/2242* (2013.01); *G03H 2001/2271* (2013.01); *G03H 2210/30* (2013.01); *G03H 2222/54* (2013.01); *G03H 2223/18* (2013.01); *G03H 2223/19* (2013.01); *G03H 2223/24* (2013.01); *G03H 2225/52* (2013.01); *G03H 2225/61* (2013.01); *G03H 2226/05* (2013.01)

(58) Field of Classification Search
    USPC ............ 359/9, 10, 11, 15, 19, 22, 32, 33, 35
    See application file for complete search history.

(56) References Cited

U.S. PATENT DOCUMENTS

| | | |
|---|---|---|
| 5,469,236 A | 11/1995 | Roessel |
| 6,621,605 B1 | 9/2003 | Grossetie et al. |
| 6,646,773 B2 * | 11/2003 | Garner ................ G03H 1/08 359/1 |
| 6,999,071 B2 | 2/2006 | Balogh |
| 7,738,151 B2 | 6/2010 | Garner et al. |

FOREIGN PATENT DOCUMENTS

| | | |
|---|---|---|
| WO | 00/75699 A1 | 12/2000 |
| WO | 02/095503 A1 | 11/2002 |
| WO | 03/060612 A1 | 7/2003 |
| WO | 2004/031841 A | 4/2004 |

OTHER PUBLICATIONS

Mishina T. et al., "Viewing-Zone Enlargement Method for Sampled Hologram that Uses High-Order Diffraction," Applied Optics, OSA, Optical Society of America, Washington, DC vol. 41, No. 8, Mar. 10, 2002, pp. 1489-1499.

Mishina T. et la., "Combination Enlargement Method of Viewing Zone for Computer-Generated Holography," Proceedings of the SPIE, SPIE, BEllingham, VA, vol. 2958 (2000), pp. 184-192.

Slinger et al., "Progress and prospects for practical electro-holographic display systems," Proceedings of SPIE, vol. 4296, pp. 18-32 (2001).

* cited by examiner

PROJECTION DEVICE AND METHOD FOR HOLOGRAPHIC RECONSTRUCTION OF SCENES

CROSS-REFERENCE TO RELATED APPLICATIONS

This is a divisional of U.S. application Ser. No. 11/914,278, filed Nov. 13, 2007, which is the US national stage of International Application No. PCT/DE2006/000896, filed May 12, 2006, which claims priority to German Application No. DE 10 2005 023 743.6, filed on May 13, 2005, the entire contents of each of which being fully incorporated herein by reference.

BACKGROUND OF THE INVENTION

The present invention relates to a projection device for the holographic reconstruction of scenes, said device comprising a spatial light modulator, an imaging system with at least two imaging means and an illumination system with at least one light source to generate sufficiently coherent light for the illumination of a hologram encoded on the light modulator. This invention further relates to a method for the holographic reconstruction of scenes.

Known 3D displays or 3D projection devices and methods usually take advantage of the stereo effect, where the light which generates the stereo impression is reflected on or emitted from a plane. However, in holography the light which is emitted by the hologram interferes in the object points of the scene, from where it propagates naturally. Holographic representations are object substitutions. In contrast, any forms of stereoscopic representations of unmoving (stills) or moving scenes do not represent object substitutions. They rather provide two plane images, one for the left and one for the right eye, where said images correspond with the two eye positions. The three-dimensional effect is created by the parallax in the two pictures. In a holographic representation, the problems known in conjunction with stereoscopy, such as fatigue, eyestrain and headache, do not occur, because there is generally no difference between viewing a real scene and a holographically reconstructed scene.

In holography it is generally distinguished between static and dynamic methods. In static holography, photographic media are predominantly used for information storage. This means that a reference beam is superimposed by a light beam which carries the object information such to record an interference pattern on the photographic medium. Such static object information is reconstructed with the help of a beam similar or identical to the reference beam. However, for example the entertainment industry or medical and military equipment manufacturers have been interested for a long time in a real-time representation of moving scenes using dynamic holography, because of the ideal spatial properties of such reconstructions. In most cases, micro displays of the same type as used in projection devices are employed. Micro displays can be, for example, liquid crystal on silicon (LCoS) panels, transmissive LCD panels or micro electro-mechanical systems (MEMS). Because their distance between the pixel centres, the pixel pitch, is small compared to other displays, a relatively large diffraction angle is achieved. A major disadvantage of hitherto known dynamic holographic methods which involve micro displays, however, is that the size of the reconstructions or of the reconstructed scenes is greatly limited by the size of the micro displays. Micro displays and similar light modulators have a size of few inches and, despite the relatively small pitch, still a diffraction angle which is so small that viewing a scene with both eyes is hardly possible. A very small pitch of only 5 µm, for example, results in a diffraction angle of about 0.1 rad at a wavelength λ of 500 nm (blue-green). At an observer distance of 50 cm, a lateral dimension of 5 cm is achieved, which does not allow the scene to be viewed with both eyes.

For a three-dimensional representation of dynamic holograms, typically computer-generated holograms, holographic reconstruction devices take advantage of transmissive or reflective light modulators, such as TFT, LCoS, MEMS, DMD (digital micro-mirror device), OASLM (optically addressed spatial light modulators), EASLM (electronically addressed spatial light modulators) and FLCD (ferro-electric liquid crystal displays) etc. Such light modulators can be of one- or two-dimensional design. The reasons why reflective light modulators are used are an inexpensive manufacturing process, a large fill factor for great light efficiency, short switching delays and only little light loss caused by absorbance compared with transmissive displays. However, the smaller spatial dimensions must be put up with.

WO 03/060612 describes a reflective LC display with a resolution of about 12 µm and a reflectance of up to 90% for real-time colour reconstruction of holograms. The reconstruction is carried out using the collimated light of one or multiple LEDs through a field lens. With this resolution, viewing is only possible in a region which is just about 3 cm wide at a distance of about 1 m, which is insufficient for the reconstructed scene to be viewed simultaneously with both eyes, i.e. in a three-dimensional way. Further, only relatively small objects can be reconstructed because of the small dimensions of the display.

WO 02/095503 discloses a holographic 3D projection device which uses a DMD chip for hologram reconstruction. However, despite the relatively high resolution, great reflectance and low switching delays of the light modulator, this device also only allows scenes with a small size to be reconstructed and to be viewed in a very small region for the same reasons mentioned in conjunction with WO 03/060612. The reason for this is again the small reconstruction space, which is defined by the dimensions of the light modulator and visibility region. Furthermore, DMD chips only partly suit holographic purposes due to their limited coherence.

WO 00/75699 discloses a holographic display which reconstructs a video hologram with the help of sub-holograms. This method is also known as tiling. Sub-holograms which are encoded on a very fast electronically addressable spatial light modulator (EASLM) are sequentially imaged into an intermediate plane. This process is executed at a high speed such that a observer perceives the reconstructions of all sub-holograms as a single reconstruction of a 3D object. The sub-holograms are arranged in a matrix structure in the intermediate plane by a specially designed illumination and imaging system, for example including a shutter which is controlled in synchronism with the EASLM and which only allows the corresponding sub-hologram to be transmitted and which in particular blocks unused diffraction orders. However, the demands made on the dynamic properties of the SLM used for reconstructing the sub-holograms are high, and a flat design does not appear to be feasible.

The above-mentioned solutions have the following major disadvantages in common. The spatial extension of the reconstruction is limited by the small size of the light modulators used for hologram reconstruction. The tiling method described in WO 00/75699 generally allows large scenes to be reconstructed, but this requires a voluminous design of the device. Because of the large number of pixels used, the computational load required to compute the hologram and the demands made on the data transfer rate will increase substantially, which makes it rather difficult to achieve real-time reconstructions. When using the sequential tiling method, as known from WO 00/75699, great demands are made on the dynamic properties of the SLM used.

SUMMARY OF THE INVENTION

Now, the object of the present invention is to provide a projection device for the holographic reconstruction of two- and three-dimensional scenes which eliminates the above-mentioned disadvantages exhibited by prior art solutions and which reconstructs and renders visible scenes of any size in a large reconstruction space so that large moving scenes can be reconstructed simply, inexpensively and with high quality using a small number of optical elements.

The object is solved as regards the projection device aspect of the invention by the features of the claimed invention and as regards the method aspect by the features of the claimed invention.

According to the present invention, the object is solved by a projection device for the holographic reconstruction of scenes comprising a light modulator, an imaging system with at least two imaging means and an illumination means with at least one light source with sufficiently coherent light for illuminating a hologram which is encoded on the light modulator, where the at least two imaging means are arranged in relation to each other such that a first imaging means images the light modulator in an enlarged fashion on to a second imaging means and that the second imaging means images a plane of a spatial frequency spectrum of the light modulator into an observer plane, which comprises at least one virtual observer window, where the virtual observer window corresponds with a diffraction order of the spatial frequency spectrum.

According to the invention, the projection device comprises in addition to the light modulator and illumination device for emitting sufficiently coherent light an imaging system which comprises the first and the second imaging means. The light modulator is a spatial light modulator of small size and will therefore be referred to as micro SLM below. The micro SLM is imaged in an enlarged fashion by the first imaging means on to the second imaging means, whereupon the spatial frequency spectrum (Fourier spectrum) of the micro SLM is imaged by the second imaging means into the virtual observer window. The observer window is thus represented by the image of the used diffraction order of the Fourier plane of the hologram. In order for the first imaging means to be able to image the entire micro SLM on to the second imaging means, all contributions of a desired diffraction order must be covered by the first imaging means. This is achieved by focusing the light which is modulated by the micro SLM in the plane of the first imaging means, in which the spatial frequency spectrum is created. For this, the micro SLM can be illuminated by a wave, which converges behind the micro SLM, seen in the direction of light propagation. Consequently, both the Fourier plane of the micro SLM and the first imaging means are situated in the plane of the spatial frequency spectrum. A frustum-shaped reconstruction space is defined by the second imaging means in combination with the observer window. In this frustum, a reconstructed scene, preferably a reconstructed three-dimensional scene, is presented to one or multiple observers. The reconstruction space also continues backwards to any extent beyond the second imaging means. The observer can thus watch the reconstructed scene in the large reconstruction space through the observer window. In this document, the term 'sufficiently coherent light' denotes light which is capable of generating interference for the reconstruction of a three-dimensional scene.

Such a projection device according to this invention thus only contains a small number of optical elements used for holographic reconstruction. Compared with known optical devices, only little demands are made on the quality of the optical elements. This ensures an inexpensive, simple and compact design of the projection device, while light modulators of small size may be used, such as micro SLM previously used in other projection devices. The limited size of the micro SLM also restricts the number of pixels. This reduces considerably the time needed to compute the hologram, which in turn allows commercially available computer equipment to be used.

In a preferred embodiment of the invention a spatial frequency filter can be provided in the plane in which the spatial frequency spectrum of the light modulator exists.

One- or two-dimensional holograms which are encoded on micro SLM in pixels, where the pixels are arranged in a regular pattern, create a periodic continuation of the spatial frequency spectrum in the Fourier plane. In order to suppress or eliminate the periodicity, a spatial frequency filter, here in particular an aperture, which only transmits the used diffraction order can preferably be disposed in this plane. The individual diffraction orders are typically overlapped, so that the aperture either cuts off information or lets pass unwanted information. However, the individual diffraction orders can be separated by way of low pass filtering of the information shown on the micro SLM, so that the information is no longer cut off by the aperture. The aperture can be generalised as a spatial frequency filter which filters out the desired diffraction order, which blocks quantification errors or other error of the micro SLM, or which modulates the wave field in another suitable way, for example for compensating aberrations of the projection device. This is done, for example, in that the spatial frequency filter adds the function of an aspherical lens.

Another advantage is that the reduction of the spatial frequency spectrum to one diffraction order and the image of that diffraction order and of the aperture as an observer window prevents any cross-talking, which would typically occur in reconstructions when using light modulators with a matrix structure. This allows to serve a left eye and a right eye of an observer one after another in a multiplex process without cross-talking. Moreover, a multiplex process with the aim to serve multiple persons only then becomes possible.

With light modulators which do not exhibit a regular pixel structure, i.e. which do not cause sampling, the Fourier plane does not show periodicity either. An aperture thus becomes superfluous. Such light modulators are, for example, OASLM.

Another preferred embodiment can for the generation of the spatial frequency spectrum comprise a third imaging means, which is disposed near the light modulator.

The third imaging means generates in its image-side focal plane the spatial frequency spectrum as the Fourier transform of the hologram encoded on the micro SLM. Using a third imaging means is particularly preferable in conjunction with collimated illumination, because without this imaging means the light would only reach the first imaging means at a large diffraction angle. The third imaging means can be disposed for example in front of or behind the micro SLM. Consequently, the third imaging means focuses into its image-side focal plane the light or wave emitted by the micro SLM. However, it is also possible that a slightly converging wave is emitted by the micro SLM and that its focusing is strengthened by using a further imaging means. However, the third imaging means is not necessary if a converging wave is used for illumination, because the reconstruction wave incident on the micro SLM can preferably be adjusted such that it converges about in the plane of the first imaging means. In any case, a focal plane is always created, which represents the Fourier plane of the micro SLM, in which also the first imaging means is disposed.

In order to make available the observer windows for the observer(s) in a large region, a position detection system can be used to detect the eye positions of the at least one observer while viewing the reconstructed scene.

The position detection system detects the eye positions or pupil positions of the observer(s) who are viewing the reconstructed scene. The scene is encoded in accordance with the observer's eye position. Then, the observer window can be tracked according to the new eye position. In particular, representations fixed in space but with realistic change in perspective, and representations with exaggerated change in perspective are possible. The latter is defined as a type of representation where the change in angle and position of the scene is greater than the change in angle and position of the observer.

At least one deflection element is provided in the display device in order to track the at least one observer window according to the observer's eye position. Such deflection elements may be mechanical, electric or optical elements.

The deflection element can for example be disposed in the plane of the first imaging means in the form of a controllable optical element, which virtually shifts the spectrum like a prism. However, it is also possible to provide a deflection element near the second imaging means. This deflection element then has the effect of a prism and, optionally, the effect of a lens. Thereby, the observer window is tracked laterally and, optionally, axially. This arrangement of the deflection element near the second imaging means is particularly preferable, because the entire imaging system from the light source to the second imaging means is then a static system. This means that the optical path up to the second imaging means will always be constant. First, this minimises the demands made on that section of the optical system, because the entry pupil of the first and second imaging means can be kept at a minimum. If the micro SLM or its image was to be displaced in order to track the observer window, the entry pupil of the first and second imaging means always had to be larger. This substantially reduces the demands made on the second imaging means. Secondly, the imaging properties of that static section of the optical system can be corrected optimally. Thirdly, the image of the micro SLM does not move on the second imaging means. This makes for example the position of the reconstruction of a two-dimensional scene on the second imaging means independent of the observer position.

The object is further solved according to the invention by a method for the holographic reconstruction of scenes where an imaging system with at least two imaging means images sufficiently coherent light of an illumination device with at least one light source into an observer plane, where the at least one light source illuminates a light modulator which is encoded with a hologram, where in a first step a spatial frequency spectrum is generated as a Fourier transform of the encoded hologram in a plane of a first imaging means, whereupon in a second step the first imaging means images the light modulator into a plane of a second imaging means, where the second imaging means images the spatial frequency spectrum from the plane of the first imaging means into at least one virtual observer window in the observer plane, whereby a reconstructed scene is presented to at least one observer in an enlarged fashion in a reconstruction space which stretches between the second imaging means and the virtual observer window, where the size of the reconstruction space is expanded due to the enlarged image of the light modulator.

According to the invention, for reconstructing the scene using a coherent or partially coherent illumination, in a first step the spatial frequency spectrum is created as the Fourier transform of the hologram encoded on the light modulator, here on a micro SLM, in the plane of the first imaging means. In a second step, the image of the micro SLM is then imaged by the first imaging means into a plane on to the second imaging means, whereby the micro SLM is enlarged. In a second step, the image of the micro SLM is then imaged by the first imaging means into a plane on to the second imaging means, whereby the micro SLM is enlarged. Following the enlarged image of the micro SLM, the image of the spatial frequency spectrum is imaged in a third step by the second imaging means from the plane of the first imaging means into the observer plane, thus forming a virtual observer window in the observer plane. The reconstruction space, which stretches from the observer window to the second imaging means, and in which the reconstructed scene is provided in an enlarged fashion to one or multiple observers, is also enlarged accordingly. It must be noted that the reconstruction space is not limited by the second imaging means and the observer window, but it continues backwards beyond the second imaging means.

With the help of the method according to this invention, two- and/or three-dimensional scenes can be represented in an enlarged fashion simultaneously or one after another, at high quality and in an enlarged reconstruction space for viewing. In mixed 2D/3D representations, the plane of the 2D representation is preferably laid inside the three-dimensional scene. In a 2D only representation, the plane of the 2D representation can preferably be laid in the second imaging means. The enlarged image of the micro SLM will then appear in this plane, when the micro SLM is in this case encoded with the two-dimensional image. The two-dimensional image can also preferably be moved towards or away from the observer.

According to a preferred embodiment of the method it may be provided that aberrations of the imaging means are taken into account when computing the hologram and compensated by the light modulator.

Aberrations result in discontinuities in the frequency spectrum and in the images, said discontinuities adversely affecting the quality of the reconstructions. When positioning the first imaging means in the Fourier plane of the micro SLM, thanks to the focusing, the first imaging means for the image only has a minimal lateral extent. This ensures aberrations of the first imaging means to be minimised. Further, it must be ensured that the first imaging means images the micro SLM in an enlarge fashion, completely and homogeneously illuminated on to the second imaging means. Aberrations of the second and, if applicable, further imaging means can be compensated by the micro SLM. Phase errors which occur in conjunction with aberrations can be corrected easily by an additional according phase shift.

It is further possible that a spatial frequency filter compensates aberrations of the imaging means used in the projection device.

Further embodiments of the invention are defined by the other dependent claims. Embodiments of the present invention will be explained in detail below and illustrated in conjunction with the accompanying drawings. The principle of the invention will be explained based on a holographic reconstruction with monochromatic light. However, it appears to those skilled in the art that this invention may as well be applied to colour holographic reconstructions, as indicated in the description of the embodiment.

DETAILED DESCRIPTION OF THE INVENTION

Figure 1:
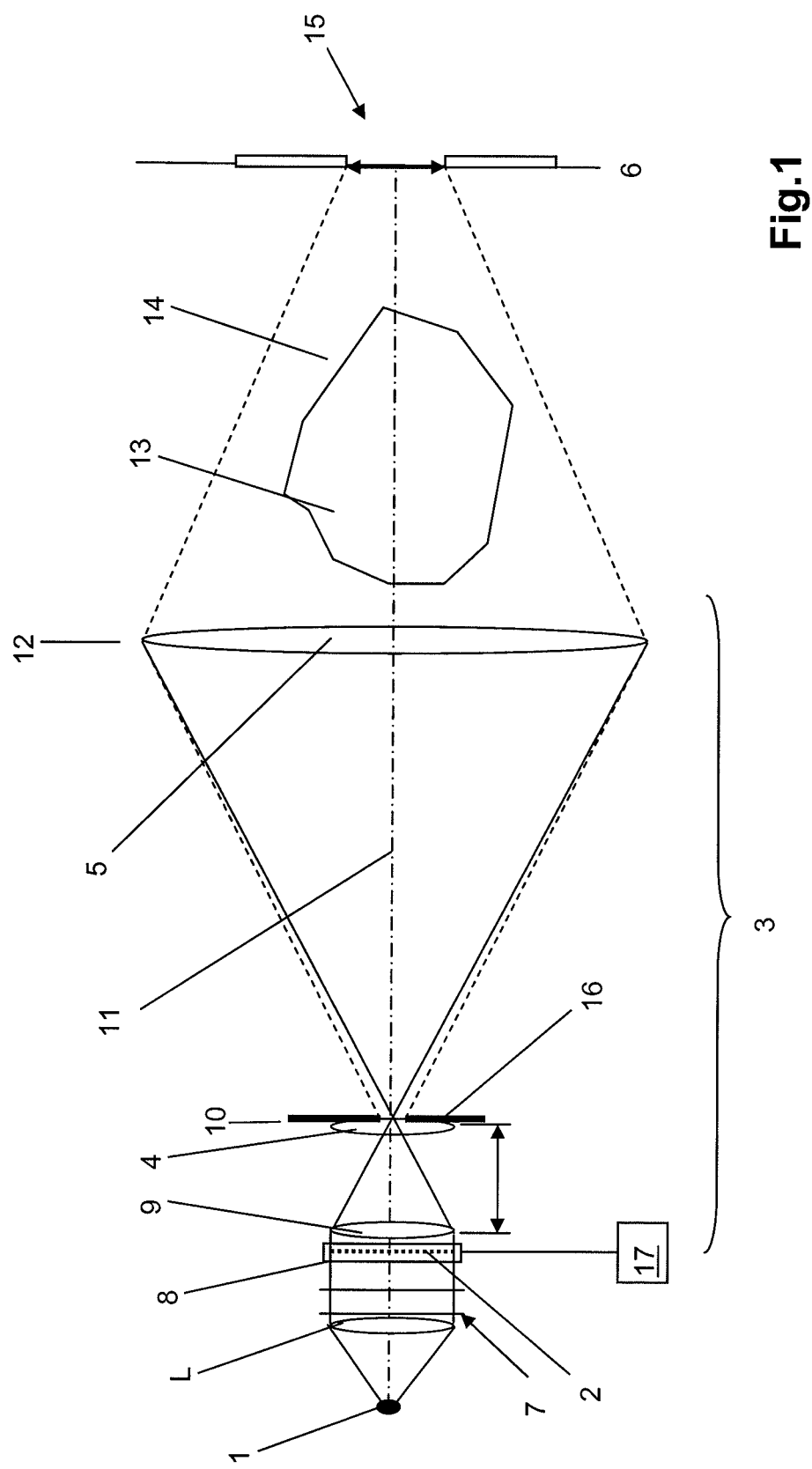
FIG. 1 shows the working principle of a projection device for the holographic reconstruction of scenes with an imaging system according to the invention.

FIG. 1 shows the working principle of the projection device according to this invention, where an imaging system 3 images an illumination device 1, here a point light source, to an observer plane 6. The imaging system 3 comprises a first imaging means 4 and a second imaging means 5. The light source 1 emits coherent or sufficiently coherent light, which is required for a holographic reconstruction of a scene. The light source 1 can be a laser, LED(s) or other light sources, where colour filters can also be used.

Now, the working principle of the projection device will be described with reference to FIG. 1. A wave emitted by the light source 1 is converted into a plane wave 7 with the help of a collimator lens L. The wave 7, which comes from the light source 1, and which is assumed to be plane after its passage through the collimator lens L, hits at a right angle a transmissive spatial light modulator 8 with regularly arranged pixels, which represents an encoded dynamic hologram 2, e.g. a CGH, where the wave front of the plane wave 7 is modulated at equidistant positions in the spatial light modulator 8 so to form a desired wave front. The spatial light modulator 8 has a small size and will therefore be referred to as micro SLM below.

A third imaging means 9 is disposed behind the micro SLM 8, seen in the direction of light propagation. The third imaging means 9, here a lens, can alternatively be disposed in front of the micro SLM 8 if a transmissive light modulator is used. It generates in its image-side focal plane 10 a spatial frequency spectrum as a Fourier transform of the information encoded on the micro SLM 8 when being illuminated with the plane wave 7. The spatial frequency spectrum can also be referred to as Fourier spectrum. If the micro SLM 8 is illuminated with non-plane converging or diverging waves, the focal plane 10 is displaced along an optical axis 11.

If the micro SLM 8 is illuminated with a plane wave and if the third imaging means 9 was omitted in the projection device, only light with accordingly large diffraction angle could reach the second imaging means 5.

The first imaging means 4 is disposed in the immediate vicinity of the focal plane 10 of the third imaging means 9. This first imaging means 4 images the micro SLM in an enlarged fashion into a plane 12, which coincides with the second imaging means 5 or is disposed in its immediate vicinity. Here, the second imaging means 5 is a lens which is much larger than the other imaging means 4 and 9, so that a scene 13 which is as large as possible is reconstructed in a frustum-shaped reconstruction space 14. While the micro SLM 8 is imaged into the plane 12, its spatial frequency spectrum is at the same time imaged into the observer plane 6 by the second imaging means 5. A virtual observer window 15 is thus formed, which is not physically existing, and whose extent corresponds with the image of a period of the spatial frequency spectrum. The observer(s) can watch the reconstructed scene 13 through the observer window 15. The reconstruction of the scene 13 is generated in a frustum-shaped reconstruction space 14, which stretches between the edges of the observer window 15 and the second imaging means 5. The reconstruction space 14 can also continue backwards to any extent beyond the second imaging means 5. In other words, the reconstruction space 14 is not limited by the second imaging means 5 and the virtual observer window 15, but it can continue backwards beyond the second imaging means 5.

Due to the equidistant scanning of information on the micro SLM 8, which is assumed to represent a regular matrix, this micro SLM 8 creates several diffraction orders in periodic continuation in the focal plane 10 of the third imaging means 9. This periodic continuation exhibits in the focal plane 10 a periodicity interval, whose size is reciprocal to the pitch of the micro SLM 8. The pitch corresponds therein to the distance between the scanning points on the micro SLM 8. The second imaging means 5 images the periodic distribution in the focal plane 10 into the observer plane 6. If an observer stays within a diffraction order in the observer plane 6, he would see an undisturbed reconstructed scene 13 with one eye, but the other eye may perceive disturbing higher diffraction orders at the same time.

For spatial light modulators which are organised in a matrix and which have a low resolution, namely a pixel pitch$\gg\lambda$ (reconstruction wavelength), the periodicity angle can be expressed in adequate approximation by ($\lambda$/pitch). Assuming a wavelength $\lambda$ of 500 nm and a pitch of the micro SLM 8 of 10 µm, a diffraction angle of about ±1/20 rad would be achieved. If the third imaging means 9 has a focal distance of 20 mm, this angle corresponds to a lateral extent of the periodicity interval of about 1 mm.

In order to suppress the periodicity, an aperture 16 is disposed in the focal plane 10 behind the first imaging means 4, said aperture 16 only transmitting one periodicity interval or only the desired diffraction order. The aperture has the effect of a low-pass, high-pass and band-pass filter in this case. The aperture 16 is imaged by the second imaging means 5 into the observer plane 6, where it forms the observer window 15. The benefit of an aperture 16 in the projection device is that cross-talking of further periods to the other eye or to eyes of another observer is prevented. However, a condition for this is a bandwidth-limited spatial frequency spectrum of the micro SLM 8.

Spatial light modulators which do not exhibit periodicity in the focal plane 10, such as optically addressable light modulators (OASLM), do not require an aperture 16 to be used.

Spatial light modulators are often organised in a matrix. The spatial frequency spectrum in the focal plane 10 will thus be continued periodically. However, the three-dimensional scene will typically require the hologram 2 to be encoded on the micro SLM 8 whose spatial frequency spectrum is larger than the periodicity interval in the focal plane 10. This results in an overlapping of individual diffraction orders. The aperture 16 in this focal plane 10 would in this case cut off an information-carrying part of the used diffraction order on the one hand and let pass higher diffraction orders on the other. In order to suppress such effects, the three-dimensional scene can be limited in the spatial frequency spectrum of the focal plane 10 by preceding filtering. Preceding filtering or bandwidth limitation is already considered when computing the hologram 2. The bandwidth-limited diffraction orders are thus separated from each other. The aperture 16 in the focal plane 10 then blocks off the higher diffraction orders without limiting the selected diffraction order. This prevents the information for one eye from cross-talking to the other eye of the observer or to other observers.

The aperture 16 can also be extended so to form a spatial frequency filter. The spatial frequency filter is a complex-valued modulation element, which modifies the amplitude and/or phase of the incident wave. The spatial frequency filter thus also serves other functions besides separating the diffraction orders, it suppresses for example aberrations of the third imaging means 9.

To be able to track the observer window 15 according to the movement of the eyes of the observer(s), the projection device comprises a position detection system 17 which detects the actual position of the observer eyes while the observer(s) watch the reconstructed scene 13. This information is used for tracking the observer window 15 using suitable means. The encoding of the hologram 2 on the micro SLM 8 can thus be adapted to the actual eye position. The reconstructed scene 13 is thereby re-encoded such that it appears horizontally and/or vertically displaced and/or turned by an angle, according to the actual observer position. In particular, representations fixed in space but with realistic change in perspective and representations with exaggerated change in perspective are possible. The latter is defined as a type of representation where the change in angle and position of the object is greater than the change in angle and position of the observer. The projection device comprises a deflection element (not shown in FIG. 1), which is shown in more detail in FIG. 5, for tracking the observer window 15 according to the eye positions.

In the case of a low resolution of the micro SLM 8, the observer window 15 does not permit the observer to watch the reconstructed scene 13 simultaneously with both eyes. The other eye of the observer can be addressed sequentially in another observer window, or simultaneously using a second optical path. If the resolution of the micro SLM 8 is sufficiently high, the holograms for the right eye and for the left eye can be encoded on one micro SLM, using spatial multiplexing methods.

When using one-dimensional spatial light modulators, it will only be possible for a one-dimensional reconstruction to take place. If the one-dimensional spatial light modulator is oriented vertically, the reconstruction will only be vertical too. With these vertically encoded holograms, the spatial frequency spectrum of the spatial light modulator only shows a periodic continuation in vertical direction in the focal plane 10. The light wave leaving the one-dimensional spatial light modulator propagates accordingly in horizontal direction. When using one-dimensional spatial light modulators, additional focusing optical elements, e.g. cylindrical lenses, must be used for focusing perpendicular to the reconstruction direction.

Figure 2:
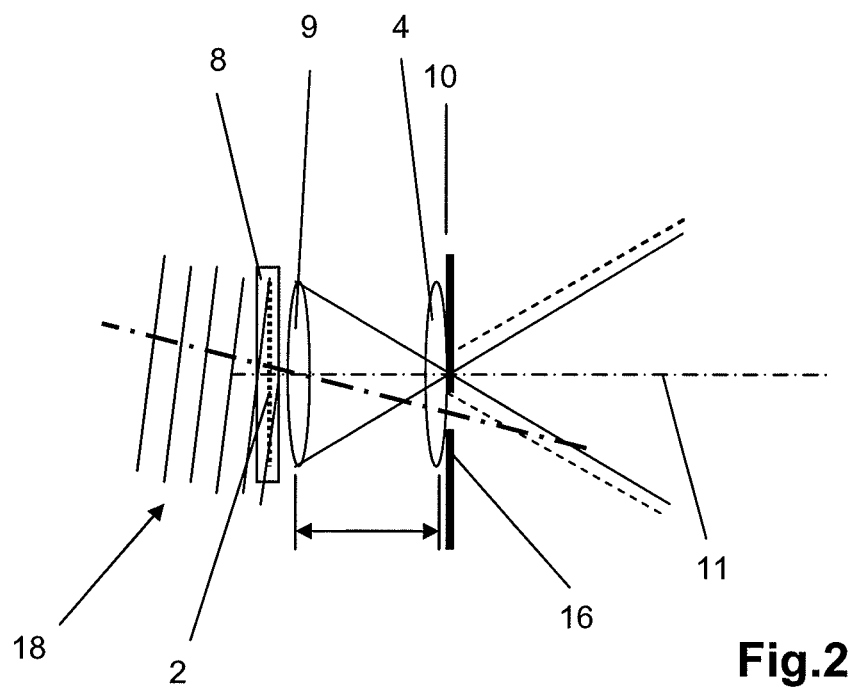
FIG. 2 shows a detail of the projection device shown in FIG. 1 during the impingement of an oblique plane wave on a light modulator.

FIG. 2 shows a detail of the projection device shown in FIG. 1. Specifically, this detail shows the micro SLM 8 with the imaging means 4 and 9 and the aperture 16. Instead of a plane wave 7 which hits the micro SLM 8 at a right angle, as shown in FIG. 1, an oblique plane wave front 18 is used in this embodiment. This is particularly beneficial if the detour phase encoding method is used to encode the hologram 2. During detour phase encoding, that is when using a pure amplitude hologram, the oblique wave hits adjacent pixels with the required phases. If the angle of incidence is chosen accordingly, the phases of every third pixel are identical, for example (Burckhardt encoding). Three pixels then encode one complex value. When using the detour phase encoding method, all diffraction orders are blocked except the typically used 1st or −1st diffraction order.

If this is the case, the centre of the zeroth diffraction order in the focal plane 10 is displaced perpendicular to the optical axis 11, as indicated by the marginal rays shown as broken lines in the Figure. The first imaging means 4 and the aperture 16 are arranged such that the $1^{st}$ or $-1^{st}$ diffraction order is transmitted, as indicated by the marginal rays shown as solid lines.

Figure 3:
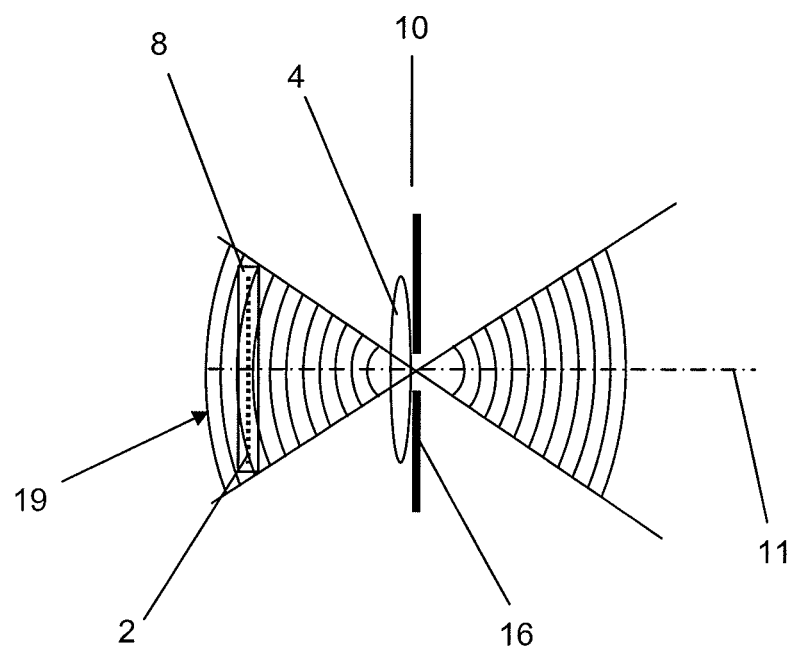
FIG. 3 shows a detail of the projection device shown in FIG. 1 during the impingement of convergent wave on the light modulator.

FIG. 3 also shows a detail of the projection device of FIG. 1. Instead of a plane wave which hits the hologram at a right angle, a converging wave 19 is used for the reconstruction. As can be seen in the Figure, the third imaging means 9 can be omitted in the case of convergent illumination, if the converging wave 19 is adjusted such that the first imaging means 4 is disposed in the focus of the converging wave 19 and that the spatial frequency spectrum of the hologram 2 encoded on the micro SLM 8 is created in the focal plane 10. If the convergence of the incident wave changes, the point of convergence will move along the optical axis 11.

Figure 4:
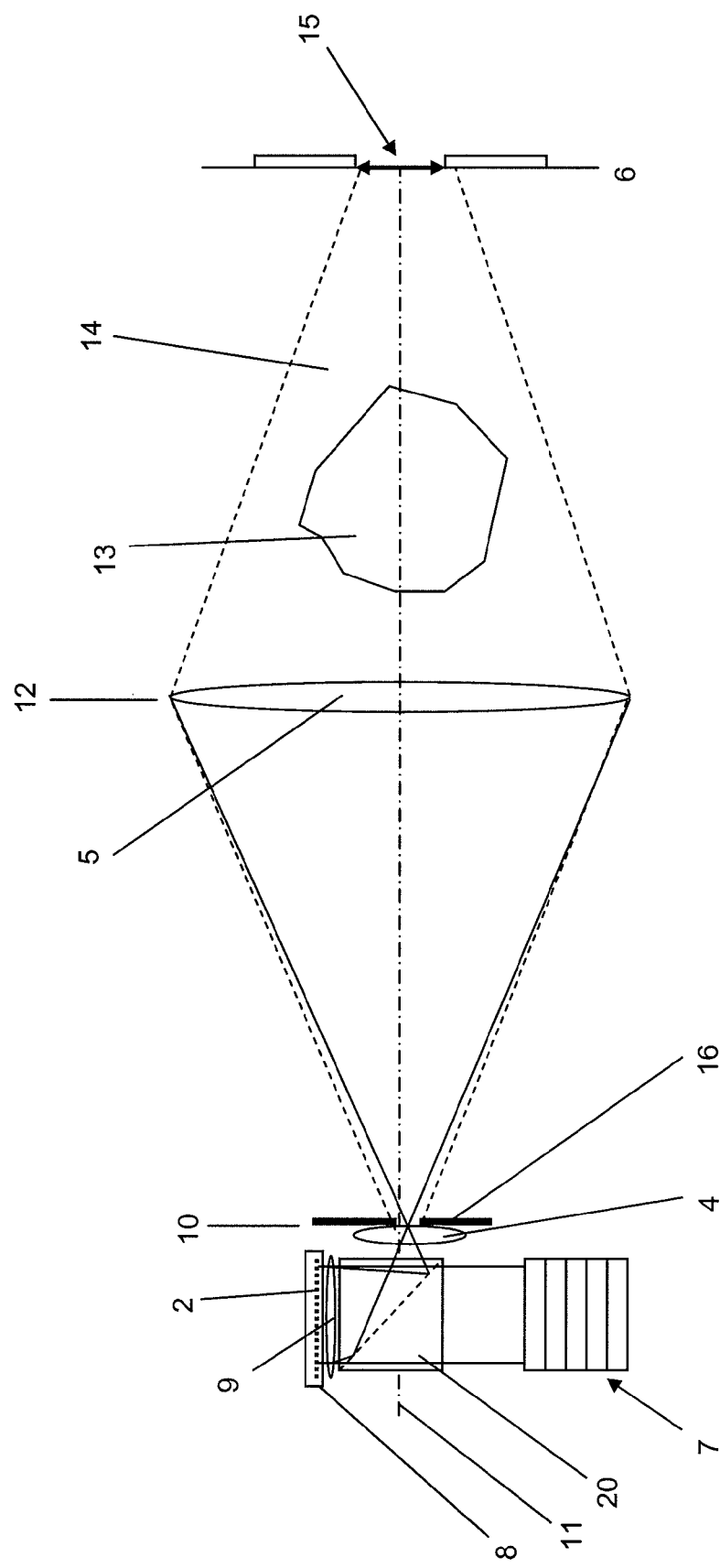
FIG. 4 shows another embodiment of the projection device according to this invention with a reflective light modulator and a beam splitter element.

FIG. 4 shows another embodiment of the projection device according to this invention with a reflective micro SLM 8 and a beam splitter element 20. The beam splitter element 20 is disposed between the third imaging means 9 and the first imaging means 4 and serves to guide the beam of the incident plane wave 7. The beam splitter element 20 can be a simple or dichroic splitter cube, a semipermeable mirror or any other beam coupler means.

Because the micro SLM 8 in this embodiment is a reflective micro SLM and the light must thus cover twice the distance because of the reflection, the encoding of the hologram 2 must be adapted accordingly. Injecting the light wave 7 through a dichroic beam splitter is particularly beneficial if the three primary colours RGB (red, green, blue) of the scene 13 are reconstructed sequentially. The three light sources for the individual primary colours are not shown in this embodiment. The scene is reconstructed as described with reference to FIG. 1. The particular benefit of the sequential reconstruction is that the optical path is always identical. Only the encoding must be adapted to the reconstruction at the different wavelengths λ.

This embodiment can be developed further in that separate channels are provided for each of the three primary colours RGB, each of said channels comprising a light source emitting light of one primary colour, a micro SLM 8, imaging means 4 and 9 and an aperture 16 or a spatial frequency filter. Again, the third imaging means 9 can be omitted if the micro SLM is illuminated using converging waves. Further, beam splitter elements can be used to combine the three channels. For simultaneous colour reconstruction of the scene 13, a beam splitter element can be provided which is made up of four adjoined individual prisms between which there are dichroic layers which exhibit different, wavelength-specific transmittance and reflectance. The light of the three channels serving the individual primary colours is injected through three side faces, and the superimposed light is emitted through the fourth side face. The light which is composed of the three primary colours then proceeds to the second imaging means 5 so to reconstruct the colour scene.

Parallel arrangements of the three channels are also possible. The second imaging means 5 can therein be used commonly for all three channels. This way, the scene is simultaneously reconstructed in all three colours.

Further, it is possible to provide separate channels for each observer eye. Again, each channel contains a monochromatic light source of one primary colour, a micro SLM 8, imaging means 4 and 9 and an aperture 16. The second imaging means 5 can again be used commonly for the two channels. The two channels image their observer windows on to the observer eyes.

Further, it is possible to provide separate channels for each observer eye, where each channel comprises three sub-channels for the three primary colours RGB.

In all above-mentioned options of colour reconstructions it must be made sure that the reconstructions in the three primary colours are fully congruent.

Figure 5:
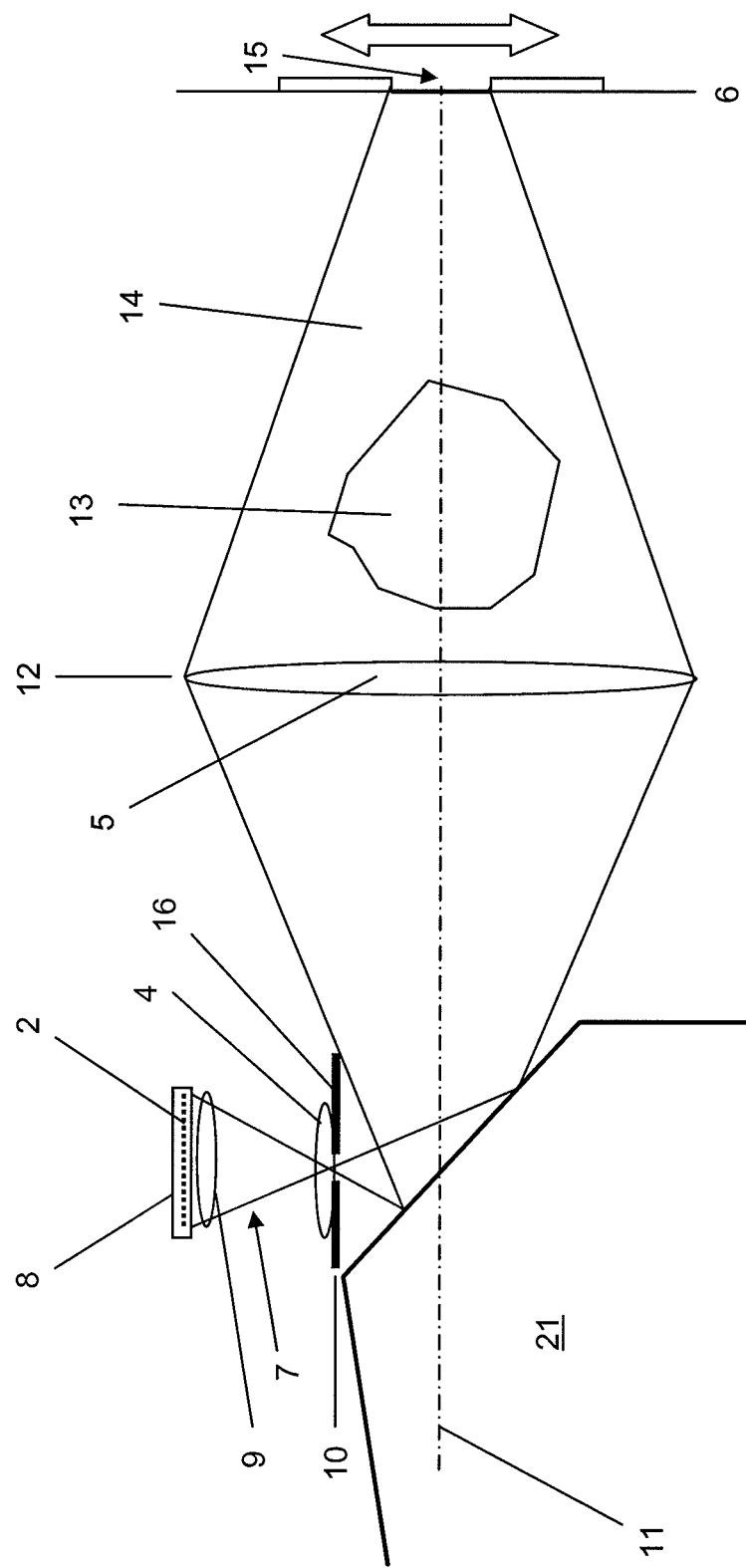
FIG. 5 shows a deflection element comprised in the projection device, said element being used for tracking an observer window.

The above-mentioned embodiments also allow the observer window 15 to be tracked according to the observer eye position, should the observer move. FIG. 5 shows the working principle of a method for tracking the observer window 15. In order to be able to track the observer window 15 in the observer plane 6 as indicated by an arrow in the Figure, the light beams are deflected by a deflection element 21, here represented by a polygonal mirror, behind the focal plane 10. This way, the observer window 15 is tracked to the observer. Mechanical deflection elements, such as polygonal mirrors, galvanometer mirrors and prisms, or optical deflection elements, such as controllable grids or other diffraction elements, may be used as deflection elements 21.

Figure 6:
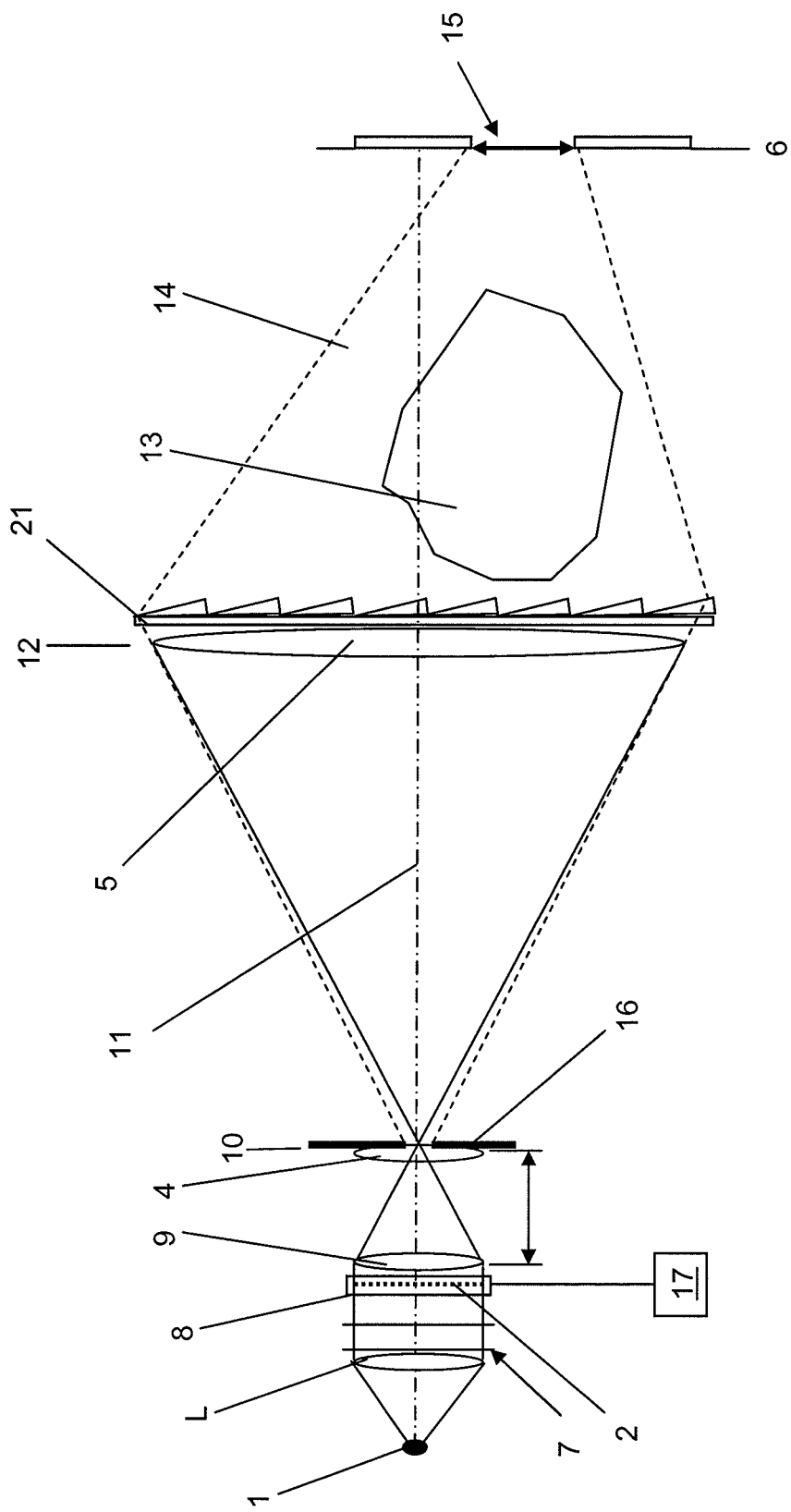
FIG. 6 shows another possibility of tracking the observer window in the projection device.

The observer window 15 is particularly preferably tracked as shown in FIG. 6. Here, the deflection element 21 has the function of a controllable prism. The deflection element 21 is disposed near the imaging means 5, i.e. in front of or behind it, seen in the direction of light propagation, or it forms an integral part of the imaging means 5 itself. This deflection element 21 optionally exhibits the effect of a lens, in addition to the effect of a prism. Thereby, lateral and, optionally, axial tracking of the observer window 15 is achieved.

Such a deflection element 21 with prism function can for example be manufactured by embedding prismatic elements which are filled with birefringent liquid crystals in a substrate made of transparent material, or by surrounding those elements with a substrate which exhibits a refractive index different from that of the prismatic elements. The angle by which a light beam is deflected by one of those elements depends on the ratio of the refractive indices of the substrate material and liquid crystal. The orientation of the liquid crystals and thus the effective refractive index is controlled by an electric field to which those elements are exposed. This way the deflection angle can be controlled with the help of an electric field, thus tracking the observer window 15 according to the movements of the observer.

It is further possible to displace the light source 1 perpendicular to the optical axis 1 in order to track the observer window 15. For this, the first imaging means 4 and the aperture 16 must be displaced according to the new position of the focal point in the focal plane 10. Again, the zeroth diffraction order of the micro SLM 8 is then situated around the focal point in the focal plane 10.

Figure 7:
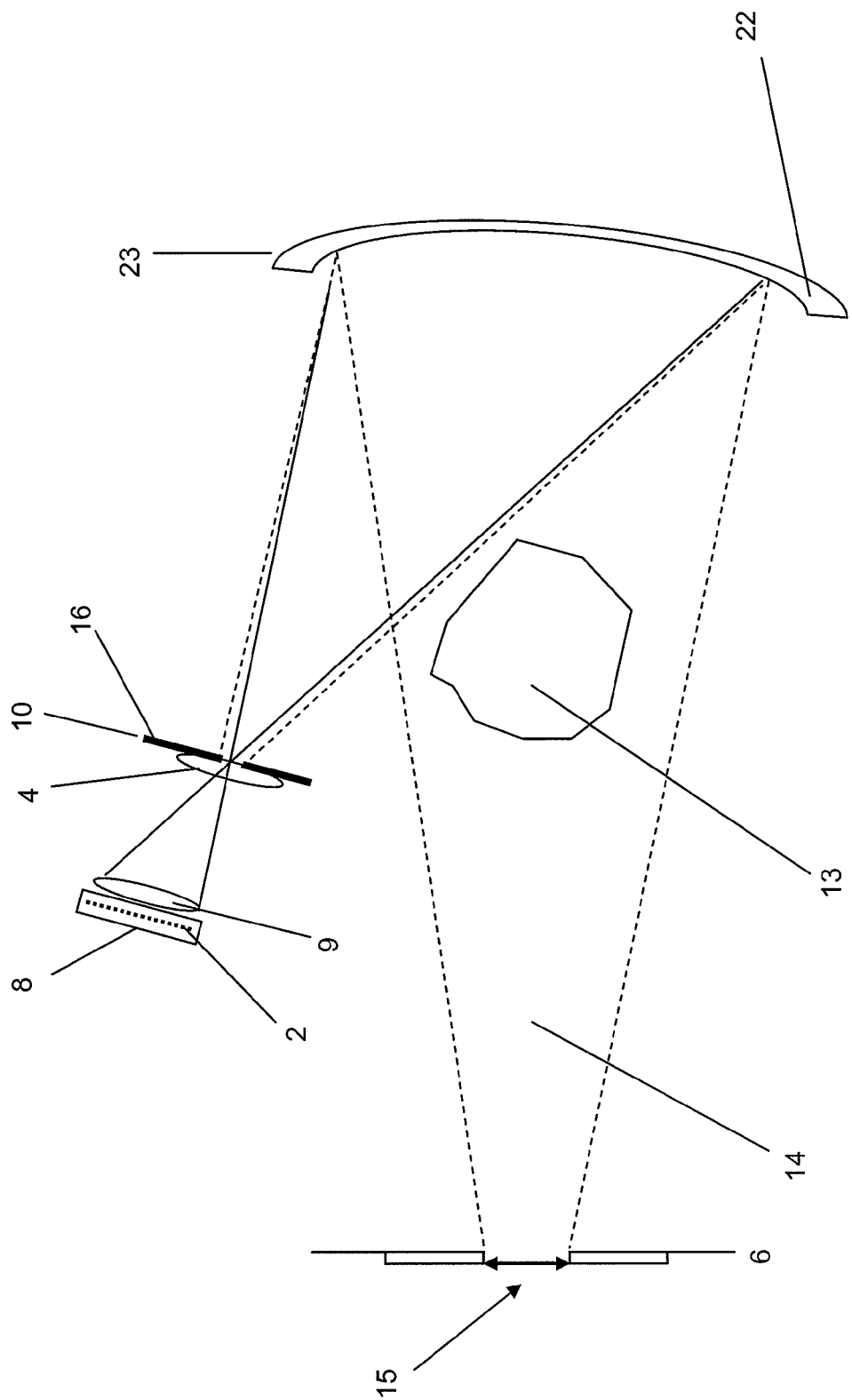
FIG. 7 shows another embodiment of the projection device according to this invention with a concave mirror as the second imaging means.

FIG. 7 shows another embodiment of the projection device according to this invention with a concave mirror 22, instead of the lens shown in FIG. 1, as the second imaging means 5. The scene is reconstructed in the same way as described in conjunction with FIG. 1. However, here the first imaging means 4 does not image the micro SLM 8 into the plane 12, but into a plane 23 on to the concave mirror 22 or to its immediate vicinity. Because the wave is reflected by the concave mirror 22, the observer window 15 is formed according to this reflection. Accordingly, the reconstruction space 14, in which the reconstructed scene 13 can be viewed, stretches between the observer window 15 and the concave mirror 22. As already mentioned above, the reconstruction space 14 can also continue backwards to any extent beyond the concave mirror 22. This way, a more compact projection device can be provided. Further advantages of using a concave mirror 22 are that in contrast to a lens, it can be made free of aberrations more easily, its manufacturing process is simpler, and it weighs less.

It is particularly beneficial to use a flat focusing mirror as the imaging means 5. This imaging means 5 can be a holographic optical element (HOE) or a diffractive optical element (DOE). The imaging means 5 exhibits a phase pattern which lets the reconstruction wave converge into the observer window 15 after the reflection. The imaging means 5 in the form of a HOE or DOE thus fulfills the same function as the concave mirror 22. The advantages of a HOE or DOE are that it is of a flat design and that it can be manufactured inexpensively. Such mirrors can be made using known methods, e.g. interferometry or lithography, by embossing, forming and subsequent curing, extruding or in any other way. They consist of photo or resist material, polymers, metal, glass or other substrates. They can also exhibit reflective layers on a relief.

Figure 8:
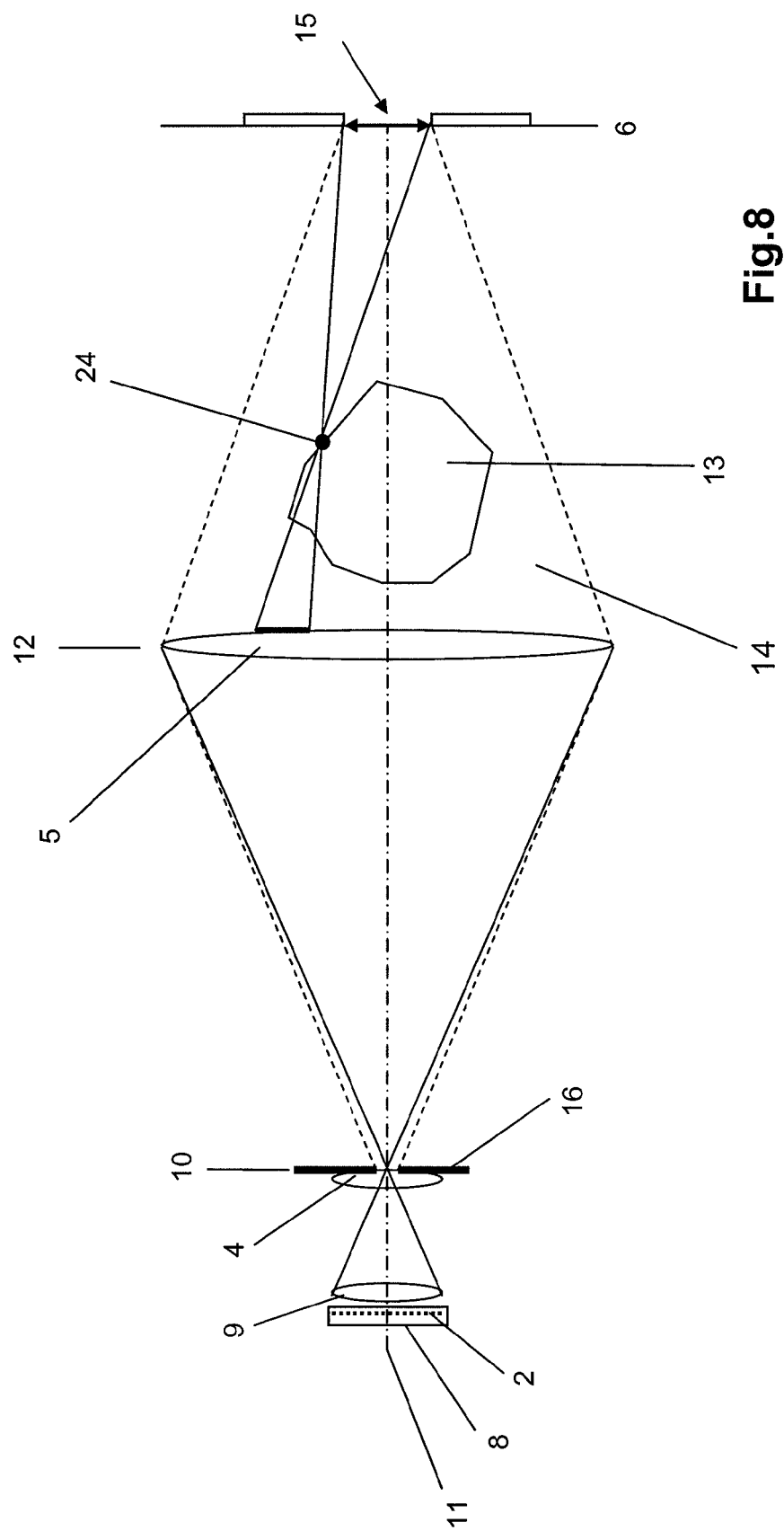
FIG. 8 shows the projection device shown in FIG. 1 where a single reconstructed point of the scene is viewed.

FIG. 8 shows the projection device of FIG. 1 with a single reconstructed point 24 of the scene 13. The imaging means 5 is relatively large compared with the two imaging means 4 and 9. Only small sections of it must be free of aberrations. To facilitate understanding, only one reconstructed point 24 of the scene 13 will be discussed, while the entire scene of course comprises a multitude of points. The point 24 is only visible within the observer window 15. The observer window 15 is an image of the selected diffraction order from the plane 10 and serves as a window through which the observer can watch the reconstructed scene 13. Bandwidth-limited encoding of the hologram 2, in order to prevent overlapping from higher diffraction orders, has already been described above. This encoding ensures that the diffraction orders do not overlap in the plane 10. The same holds true for the image in the observer plane 6. Each individual point of the reconstructed scene 13 is only generated by a part of the micro SLM 8 on the second imaging means 5. The projection of the marginal rays of the observer window 15 through the point 24 on to the second imaging means 5 clearly shows a small region on the imaging means 5 which contributes to the reconstruction of that point 24. This means that for each individual point of the scene there is such a limited region on the imaging means 5. These regions are small in comparison with the large second imaging means 5. The requirements for coherence thus relate to those small regions only, in particular compliance with the requirement for sufficiently small wave front distortion<<$\lambda/10$. The image must only be of highly-coherent quality in those small regions, where all points of the scene 13 must be considered. It is thus not necessary for the imaging means 5 to exhibit an extremely low wave front distortion across the entire element. This reduces the demands made on the second imaging means 5 largely on to geometrical form stability.

Further, the projection device does not only take advantage of the micro SLM 8 for the reconstruction of very large two- and three-dimensional scenes 13 which are formed in the reconstruction space 14 through the observer window 15, but preferably also uses it simultaneously for corrections to the optical imaging means 4, 5 and 9. Aberration-free imaging means should be used for holographic reconstructions. Examples of corrections of aberrations will be described below. Aberrations of the third imaging means 9 become apparent as phase errors by which the wave front deviates from the ideal wave front. In a hologram without encoded information, where a plane wave leaves the micro SLM 8, the diffraction-limited wave should be focused in the plane 10, in which the first imaging means 4 and a spatial frequency filter 16—as an aperture for suppressing undesired diffraction orders and for fulfilling other functions, such as aberration correction—are disposed.

However, aberrations cause this above-mentioned focus to be blurred and thus disturbances in the spatial frequency spectrum to occur which adversely affect the quality of the reconstruction. Such phase errors can be compensated easily by an additional phase shift. Another means for correcting the third imaging means 9 has already been described in conjunction with the function of the spatial frequency filter.

The enlarged image of the micro SLM 8 by the first imaging means 4 on to the second imaging means 9 is typically prone to aberrations. Enlarging optical systems for the imaging means 4 are for example optical projection systems as used in back-projection TV sets which are commercially available today. Image definition is a major criterion, so that chiefly spherical aberrations, but also coma and astigmatism are already widely suppressed in these optical systems. While residual distortion and field curvature in the projection are tolerable for the user of those devices, such aberrations may cause the reconstructions to be greatly biased if they occur in the present holographic projection device. The distortion of the first imaging means 4 means a lateral geometrical deviation of the enlarged image of the micro SLM 8 on to the imaging means 5. The waves which leave the second imaging means 5 do then not converge in the desired position of the reconstructed object point, but are shifted.

A major optical error is the field curvature when imaging the micro SLM 8 on to the second imaging means 5. Field curvature means mainly that the required phase values are biased on the imaging means 5, which becomes apparent in the form of a three-dimensional distortion, i.e. lateral and axial. Both effects, field curvature and distortion, as well as coma and astigmatism can generally be kept sufficiently small by way of careful design and low manufacturing tolerances of the first imaging means 4; however, this requires great efforts and is rather costly. Phase bias due to field curvature in the projection device can be compensated preferably by the micro SLM 8. Such phase errors can be compensated by an additional phase shift. Moreover, coma and astigmatism can also be reduced by appropriate encoding. The distortion can for example be compensated by selecting other pixels of the micro SLM 8, i.e. by encoding the hologram values on to pixel positions which were determined taking into consideration the extent of distortion. In a similar way, i.e. as described for the first imaging means 4, the aberrations of the second imaging means 5 are also compensated with the help of the micro SLM 8. The deviations of the waves which leave the second imaging means 5 must typically be much smaller than $\lambda/10$. This requires enormous efforts again. Using the above-mentioned possibility of correction, aberrations with regard to the second imaging means 5 can also be corrected easily by way of according encoding.

Generally, all and any aberrations of the imaging means 4, 5 and 9 can be reduced or compensated with the help of the micro SLM 8. The aberrations are determined in a suitable way before the reconstruction. Thus computed phase errors can be compensated by an additional phase shift of the micro SLM 8.

The present projection device makes it possible for spatial light modulators of small size to be used for the reconstruction and viewing of large, two- or three-dimensional scenes. The observer(s) can thus move freely in the observer plane 6 while they watch a reconstructed scene. Two- and three-dimensional scenes can be shown simultaneously or one after another. Moreover, the projection device consists of commercially available optical elements with relatively low demands as regards manufacturing precision and freedom of aberrations. First, the imaging means 4 and 5 can be corrected by the micro SLM 8, and secondly, a low wave front distortion is only required across small regions of the large imaging means 5.

In the special case of a mere two-dimensional image, as in the application of today's television, the image is projected on to the imaging means 5 or into its immediate vicinity. The hologram 2 is computed such that a two-dimensional scene is reconstructed in the plane 12 or 23 of the second imaging means 5. In addition, the observer who is watching the scene can axially displace a plane in which a reconstruction of the two-dimensional scene is provided by way of re-computing the hologram 2. This means that the representation can be moved towards or away from the observer. Moreover, details can be zoomed so that the observer can watch those more precisely. These activities can be initiated by the respective observer himself interactively.

Possible applications of the holographic projection device include displays for a two- and/or three-dimensional presentation in private or working environments, for example computer displays, TV screens, electronic games, in the automotive industry for displaying information, in the entertainment industry, in medical engineering, here in particular for minimally-invasive surgery applications or spatial representation of tomographically established information, and in military engineering for the representation of surface profiles. It appears to those skilled in the art that the present projection device can also be applied in other areas not mentioned above.

The invention claimed is:
1. A method for the holographic reconstruction of scenes, comprising:

imaging sufficiently coherent light of an illumination device having at least one light source into an observer plane by an imaging system having at least two imaging means, illuminating a light modulator encoded with a hologram by the at least one light source, generating a spatial frequency spectrum as a Fourier transform of the encoded hologram in a plane of a first imaging means, imaging the light modulator into a plane of a second imaging means by the first imaging means, imaging the spatial frequency spectrum from the plane of the first imaging means into at least one virtual observer window in the observer plane by the second imaging means, and presenting a reconstructed scene to at least one observer in an enlarged fashion in a reconstruction space, where the size of the reconstruction space is expanded due to the enlarged imaging of the light modulator.

2. The method according to claim 1, wherein the second imaging means images the spatial frequency spectrum into the virtual observer window, through which an observer watches the reconstructed scene.

3. The method according to claim 1, wherein a third imaging means is disposed near the light modulator, said third imaging means generating in its image-side focal plane the spatial frequency spectrum of the hologram encoded on the light modulator.

4. The method according to claim 1, wherein a spatial frequency filter provided in the imaging system lets pass a selected periodicity interval of the spatial frequency spectrum.

5. The method according to claim 4, wherein the spatial frequency filter compensates aberrations of the imaging means.

6. The method according to claim 1, wherein aberrations of the imaging means are taken into account when computing the hologram and compensated by the light modulator.

7. The method according to claim 1, wherein the bandwidth of the spatial frequency spectrum in the plane of the first imaging means is limited during a computation of the hologram.

8. The method according to claim 1, wherein a position detection system detects eye positions of at least one observer who watches the reconstructed scene.

9. The method according to claim 8, wherein the holographic encoding of the light modulator is updated during changing of the eye position of the observer.

10. The method according to claim 9, wherein the reconstructed scene is encoded such that it appears horizontally and/or vertically displaced and/or turned by an angle in accordance with the changing of the eye position of the observer.

11. The method according to claim 8, wherein at least one virtual observer window in the observer plane is tracked in accordance with the eye position of the observer.

12. The method according to claim 11, wherein at least one deflection element tracks the at least one virtual observer window.

13. The method according to claim 1, wherein the hologram is computed such that a two-dimensional scene is reconstructed in the plane of the second imaging means.

14. The method according to claim 1, wherein the observer who is watching the scene axially displaces a plane in which a reconstruction of a two-dimensional scene is provided by way of re-computing the hologram.

15. The method according to claim 1, wherein a colour reconstruction of the scene is performed sequentially for the three primary colours.

16. The method according to claim 1, wherein a colour reconstruction of the scene is performed simultaneously for the three primary colours.

17. The method according to claim 16, wherein the simultaneous colour reconstruction of the scene is performed using three parallel channels, each of which comprising a light source, a light modulator, a first imaging means and a third imaging means.

* * * * *